US010608840B2

(12) United States Patent
Gang et al.

(10) Patent No.: US 10,608,840 B2
(45) Date of Patent: Mar. 31, 2020

(54) AUTOMATIC ADDRESSING OF NETWORKED NODES

(71) Applicant: Simmonds Precision Products, Inc., Vergennes, VT (US)

(72) Inventors: Travis Gang, Burlington, VT (US); Peter Carini, Underhill, VT (US); Benjamin D. McBride, Burlington, VT (US); Matthew B. Burleigh, Essex, VT (US); David Joseph Fontaine, Ferrisburgh, VT (US); Christopher Fitzhugh, Essex Junction, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 47 days.

(21) Appl. No.: 15/269,399

(22) Filed: Sep. 19, 2016

(65) Prior Publication Data
US 2018/0083797 A1    Mar. 22, 2018

(51) Int. Cl.
| H04L 12/40 | (2006.01) |
| H04L 29/12 | (2006.01) |
| H04L 29/08 | (2006.01) |
| H04L 29/06 | (2006.01) |
| H04L 29/14 | (2006.01) |

(52) U.S. Cl.
CPC .. *H04L 12/40169* (2013.01); *H04L 12/40013* (2013.01); *H04L 61/2038* (2013.01);
(Continued)

(58) Field of Classification Search
CPC ... H04L 29/12; H04L 12/40; H04L 12/40169; H04L 12/40013; H04L 12/40032; H04L 12/40078; H04L 12/403; H04L 2012/40215; H04L 67/12; H04L 61/2038; H04L 69/28; H04L 69/40; H04L 43/16; H04L 45/22; H04L 12/42; H04L 61/6077; H04L 61/1535; H04L 61/2053;
(Continued)

(56) References Cited

U.S. PATENT DOCUMENTS

| 4,021,608 A * | 5/1977 | Brodeur ................. H04L 21/04 178/23 R |
| 6,240,478 B1 * | 5/2001 | Brickell ............. G06F 13/4286 370/438 |

(Continued)

FOREIGN PATENT DOCUMENTS

| CN | 103747565 A | 4/2014 |
| DE | 102007044820 A1 | 4/2009 |

OTHER PUBLICATIONS

Extended European Search Report for EP Application No. 17187550.3, dated Feb. 7, 2018, 7 pages.

*Primary Examiner* — Ricardo H Castaneyra
(74) *Attorney, Agent, or Firm* — Kinney & Lange, P.A.

(57) ABSTRACT

A network and method of addressing a network includes a host computer, a communication bus connected to the host computer, and a plurality of nodes connected to the communication bus. Each of the plurality of nodes includes a node controller, a timer, a communication input connected to the communication bus and a communication output connected to the communication bus. The node controller is configured to connect the communication input to the communication output upon successful receipt of an address from the host computer or upon the timer reaching a threshold.

12 Claims, 6 Drawing Sheets

(52) U.S. Cl.
CPC .............. *H04L 67/12* (2013.01); *H04L 69/28* (2013.01); *H04L 69/40* (2013.01)

(58) Field of Classification Search
CPC ........ H04L 43/50; H04L 43/0811; G06F 3/00; G06F 13/00; G06F 13/4282; G06F 13/4247; H04W 84/18; H04W 4/80
See application file for complete search history.

(56) References Cited

U.S. PATENT DOCUMENTS

| | | | |
|---|---|---|---|
| 6,587,968 B1 * | 7/2003 | Leyva | H04L 12/40032 714/43 |
| 6,700,877 B1 * | 3/2004 | Lorenz | H04L 12/403 370/254 |
| 8,543,263 B2 | 9/2013 | Danielsson et al. | |
| 2004/0117537 A1 * | 6/2004 | Marcel Vandensande | G05B 19/0423 710/305 |
| 2005/0111372 A1 * | 5/2005 | Koestner | H04L 1/22 370/248 |
| 2007/0268913 A1 * | 11/2007 | Denecheau | H04L 12/1854 370/397 |
| 2010/0223090 A1 * | 9/2010 | Lozito | G06Q 10/08 705/333 |
| 2010/0274945 A1 * | 10/2010 | Westrick, Jr. | H04L 29/12254 710/316 |
| 2014/0052863 A1 | 2/2014 | Hart | |
| 2014/0173081 A1 | 6/2014 | Knapp et al. | |

* cited by examiner

US 10,608,840 B2

AUTOMATIC ADDRESSING OF NETWORKED NODES

BACKGROUND

The present invention relates generally to networks, and in particular to a system and method for addressing nodes within a network.

Wired node networks often include a master node or node controller and one or more slave nodes. The nodes are often addressed either at manufacture or during installation and/or maintenance. The address is stored by the node using, for example, non-volatile memory storage, discrete hardware inputs, or other means. Because each node is connected to a shared communication bus, the unique node addresses are utilized to distinguish which communication messages each node should act upon, and which messages should be ignored. If multiple nodes were to reply at the same time, bus contention would occur and the resulting response would be indecipherable. Also, for some buses and/or bus speeds, a terminating resistor may be needed at the end of the communication bus to prevent reflections and improve the speed and reliability of communications.

In a network of sensors, each node's address must correlate to the node's physical location, such that the data received from the node can be properly handled. Thus, the host must also be programmed with the unique addresses at the time of manufacture, installation and/or maintenance of the network, or the host must generate addresses based upon knowledge of the system. Additionally, when maintenance of a node is necessary, a replacement node must either be given the same address as the node requiring maintenance, or the host must be provided with a new address of the replacement node. It is desirable to provide an automatic system and method for addressing nodes such that the addressing step may be removed from manufacture of the nodes and/or any manual steps for addressing nodes during installation may be eliminated.

SUMMARY

A method of addressing a plurality of nodes for a communication network includes starting a first timer; providing, from a host computer, a first address to the first node over the communication network; connecting, by the first node, a first communication input to a first communication output if the first address is successfully received by the first node; connecting, by the first node, the first communication input to the first communication output if the first timer reaches a first threshold; and providing, from the host computer, a second address to a second node of the plurality of nodes.

A further method of addressing each of a plurality of nodes for a communication network includes powering, by a power bus, a first node of the plurality of nodes at a first power input; starting a first timer by the first node; providing, from a host computer, a first address to the first node over the communication network; connecting, by the first node, the power bus to a second node of the plurality of nodes if the first address is successfully received by the first node; connecting, by the first node, the power bus to the second node if the first timer reaches a first threshold; and providing, from the host computer, a second address to the second node of the plurality of nodes.

A network includes a host computer, a communication bus connected to the host computer, and a plurality of nodes connected to the communication bus. Each of the plurality of nodes includes a node controller, a timer, a communication input connected to the communication bus and a communication output connected to the communication bus. The node controller is configured to connect the communication input to the communication output upon successful receipt of an address from the host computer or upon the timer reaching a threshold.

DETAILED DESCRIPTION

A system and method is disclosed herein for addressing nodes within a network. The network includes a host computer and a plurality of nodes which may be, for example, sensors onboard an aircraft or other vehicle. For each node, the host computer provides an address to the node over a communication bus. Upon receipt of an address, each node provides an acknowledgement and stores the address in a local memory. The node then connects the communication bus and/or power bus such that the host may communicate with the next node in line. If the communication bus requires a terminating resistor, then the node may also disconnect a respective terminating resistor from the communication bus.

Each node may also include a timer utilized to handle malfunctions within the node. Upon detecting a connection to the host computer on the communication network, the timer may be started. The host computer may also include a local timer that is utilized during addressing of each node. If the timer of the node reaches a threshold value, the communication bus may be automatically connected to the next node in the line. If the communication bus requires the use of terminating resistors, a respective terminating resistor may also be automatically disconnected from the communication bus. If the node is functioning properly, the node stops the timer and acknowledges receipt of its address. The host computer, upon reaching its own threshold timer value without receiving an acknowledgement from the current node, knows that the respective node is malfunctioning and moves on to address the following node in line.

Figure 1:
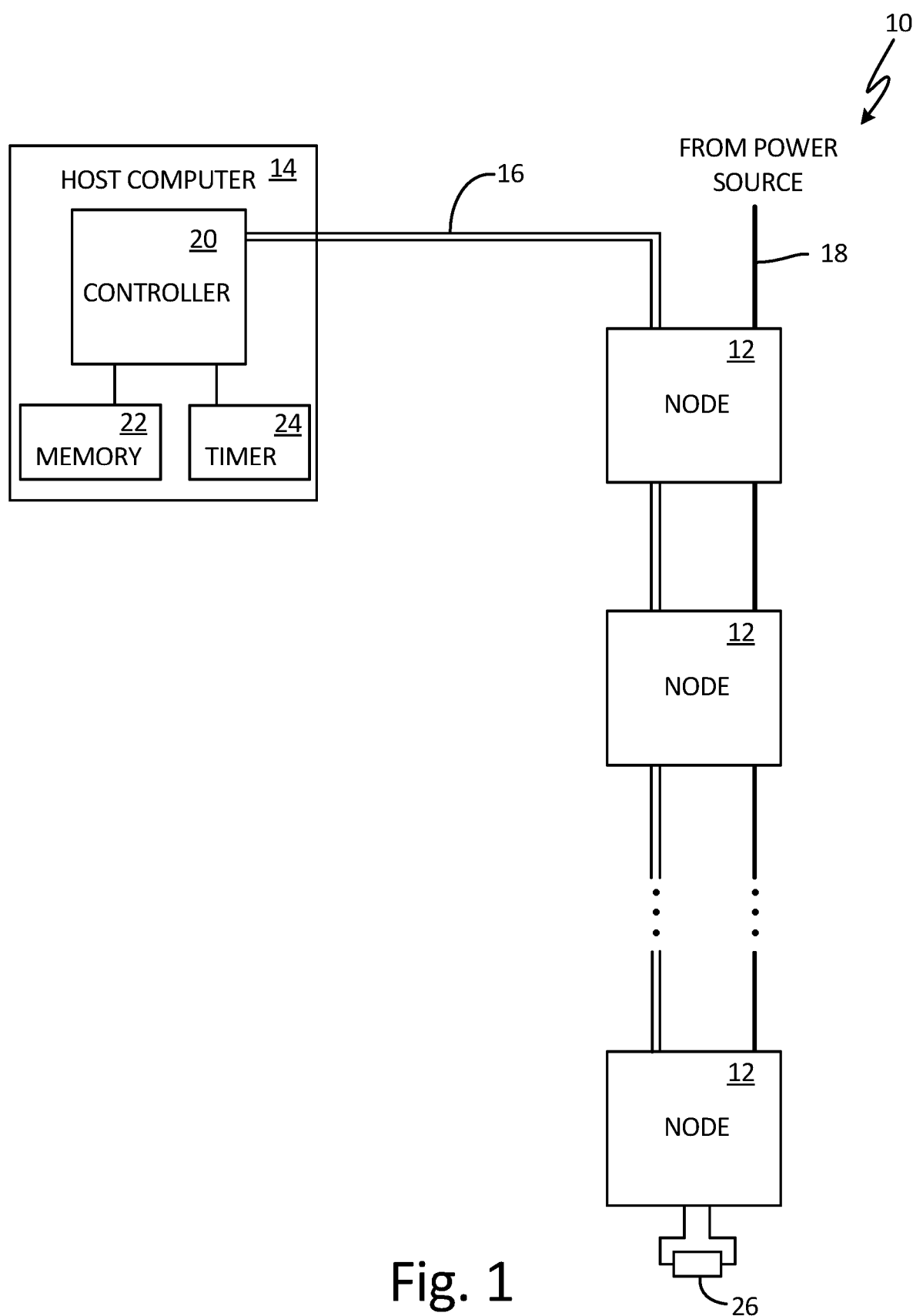
FIG. 1 is a block diagram illustrating a network of nodes connected to a host computer.

FIG. 1 is a block diagram illustrating network 10 of nodes 12 connected to host computer 14. Host computer 14 is connected to communicate with nodes 12 over communication bus 16. Nodes 12 may receive power from power bus 18. Power bus 18 may provide alternating current (AC) or direct current (DC) power from any AC or DC power source. Although illustrated as only powering nodes 12, power bus 18 may also power host computer 14. While illustrated in FIG. 1 as receiving power from power bus 18, nodes 12 and/or host computer 14 may alternatively be powered by local power sources, for example, such as batteries or energy harvesters. In other embodiments, nodes 12 may also receive power from host computer 14. Nodes 12 may be any devices which require addressing from host computer 14. Nodes 12 may be, for example, digital sensors and/or analog sensors with digital interfaces, or any other modular circuits that connect to shared communication bus 16. Host computer 14 may be any electronic system capable of automatically addressing nodes 12 such as, for example, an aircraft avionics unit. Communication bus 16 may be any analog or digital shared communication bus such as, for example, an RS-485 bus, a fiber optic bus, or any other communication bus.

Host computer 14 may include controller 20, memory 22 and timer 24. Controller 20 may be any digital circuit such as, for example, a microcontroller, a microprocessor, a programmable logic device (PLD) or any other digital circuit. Timer 24 may be integral to controller 20, or may be a separate digital or analog circuit. Memory 22 may also be integral to controller 22 or may be a separate circuit and may be any volatile or non-volatile memory. While illustrated as integral to host computer 14, controller 20 and/or memory 22 and timer 24 may be implemented external to host computer 14.

Network 10 may include end terminating resistor 26 for communication bus 16. End terminating resistor 26 may be utilized to prevent reflections and increase the speed and reliability of communications on bus 16. While illustrated as including end terminating resistor 26, network 10 may not require terminating resistors if the length and/or baud rate of communication bus 16 are such that reflections are not a concern for the data integrity on communication bus 16. Also, other types of communication buses, such as fiber optic buses, for example, do not require terminating resistors.

Figure 2A:
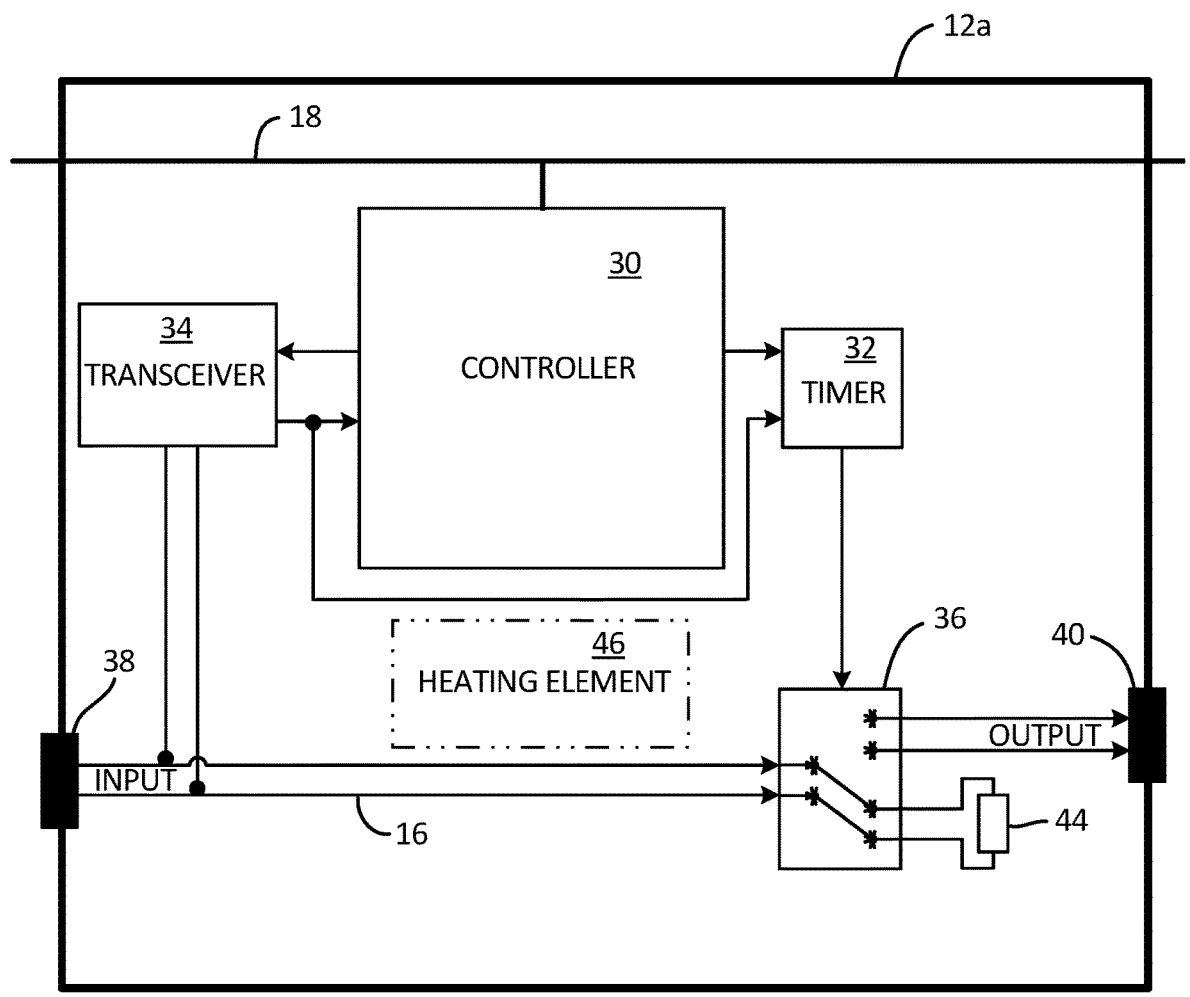
FIGS. 2A and 2B are block diagrams illustrating embodiments of nodes within a network.
Figure 2B:
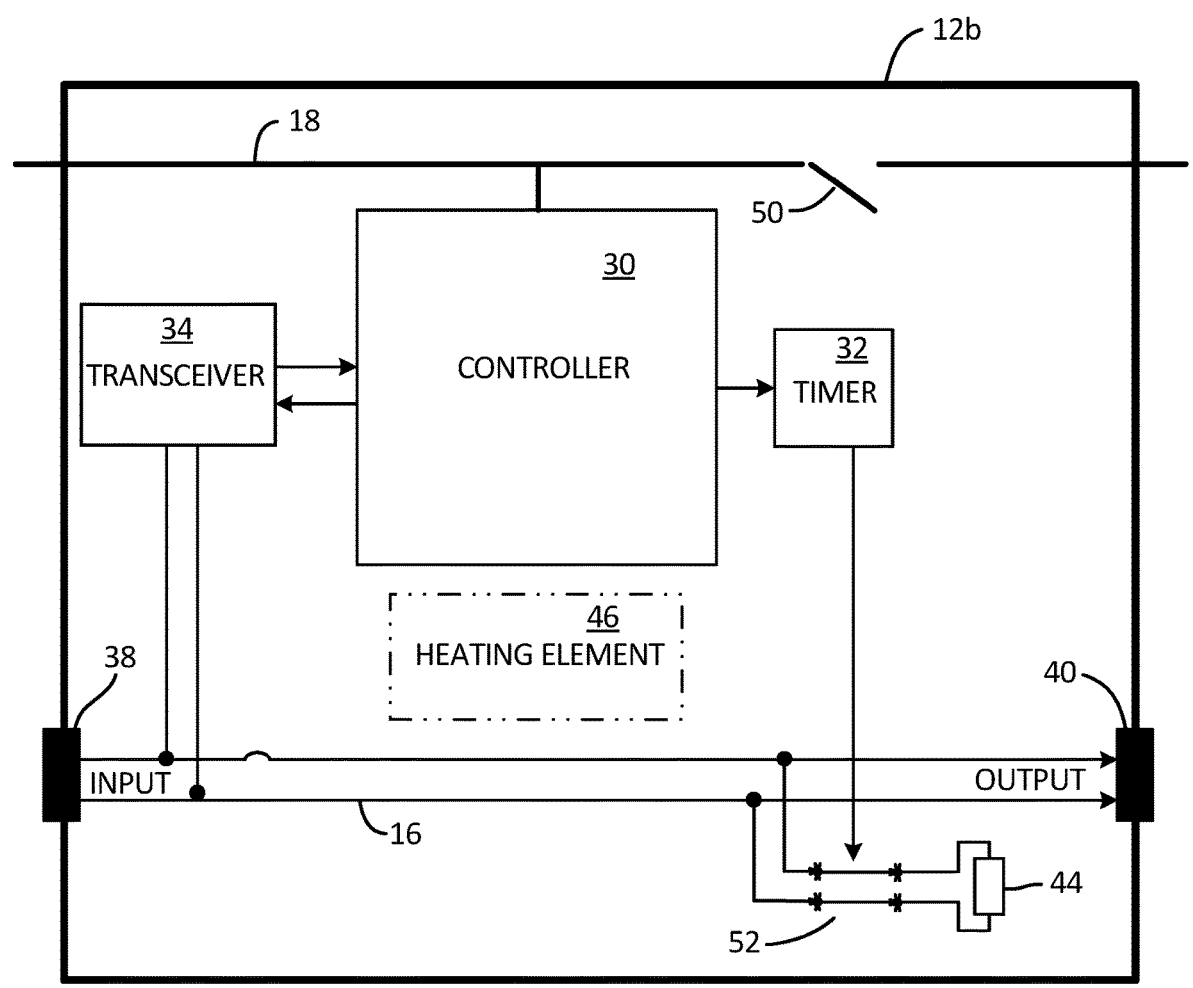

FIGS. 2A and 2B are block diagrams illustrating embodiments of nodes 12. FIG. 2A is a block diagram illustrating node 12a that is connected within network 10. Node 12a includes controller 30, timer 32, transceiver 34, switch 36, communications input 38, communications output 40, terminating resistor 44 and an optional heating element 46. Controller 30 is any analog or digital circuit capable of controlling node 12a such as, for example, a programmable logic device (PLD). Switch 36 is any device controllable to select between one or more states. For example, switch 36 may be a relay or one or more transistors. While illustrated as a relay controllable to selectively connect communications input 38 to either communications output 40 or terminating resistor 44, switch 36 may comprise multiple switches. For example, one switch may be implemented to enable/disable communication between communications input 38 and communications output 40, while another switch may be implemented to enable/disable connection of terminating resistor 44 to/from communication bus 16. Switch 36 and terminating resistor 44 may be implemented integral to node 12a, or may be implemented as part of communication bus 16. In other embodiments, terminating resistor 44 may not be necessary. In those embodiments, a single switch, repeater or other device may be utilized to control connection of communication bus 16 to the next node 12a in line. For example, in an embodiment in which communication bus 16 is a fiber optic bus, switch 36 may be implemented as a repeater controllable to connect bus 16 to the next node 12a in line.

An address may be received from host computer 14 on communications input 38 and provided to controller 30 through transceiver 34. Upon receipt of the address, controller 30 may store the address, for example, in a local memory that may be integral to, or separate from, controller 30. Following logging of the address, controller 30 may provide an acknowledgement through transceiver 34 to communication bus 16 intended for host computer 14. The acknowledgment may be a series of bits, for example, that host computer 14 recognizes as an acknowledgement. Shortly before or after transmission of the acknowledgement, controller 30 may operate switch 36 to connect communications input 38 with communications output 40 and disconnect terminating resistor 44 from communication bus 16. This allows host computer 14 to provide an address to the next node 12a within network 10.

Node 12a may be the end node for network 10, meaning it is the final node 12a on communication bus 16 from host computer 14 and is the last to receive an address. Node 12a may be programmed to know it is an end node, may receive communication from host computer 14 indicating that node 12a is an end node, or may remain unaware of its status as the end node of network 12. End terminating resistor 26 (shown in FIG. 1) may be utilized so that it is unnecessary that node 12a has knowledge that it is an end node. End node 12a may disconnect its respective terminating resistor 44 from communication bus 16 because end terminating resistor 26 will provide termination for communication bus 16. In other embodiments, node 12a may be programmed to know it is an end node, and keep the respective terminating resistor 44 connected to communication bus 16 following receipt of an address.

Optional heating element 46, which may be a resistive element, for example, may be utilized to increase the temperature of a circuit board and/or other components of node 12a. For example, sensors or other circuits may be incapable of operating at temperatures below a threshold temperature. This threshold may be, for example, $-40°$ Celsius (C) or any other temperature based upon the materials and construction of node 12a. In some environments, nodes 12a may be at a low temperature at startup such as, for example, $-55°$ C. Upon receiving initial power from power bus 18, heating element 46 may be used to increase the temperature of components of node 12a to an operable temperature, such as $-40°$ C., or until detection that node 12a has become operational.

Timer 32 may be implemented to track an amount of time that has elapsed since node 12a has become connected to host computer 14. For example, upon receiving power and/or upon detecting a connection to communication bus 16, node 12a may start timer 32. Timer 32 may be implemented, for example, utilizing a resistor-capacitor (RC) circuit or any other digital or analog circuit. A capacitor may be sized, for example, such that the capacitor reaches a desired charge level after a threshold time has elapsed. Therefore, upon power up or connection to host computer 14 on communication bus 16, the capacitor begins to charge, and timer 32 detects when the capacitor has reached the desired charge level.

Controller 30 may be implemented to operate switch 36 upon timer 32 reaching the threshold time, or timer 32 may be configured to automatically operate switch 36 upon reaching the threshold time. This is desirable in the event that there is a malfunction in operation of node 12a, such as a malfunction in operation of controller 30, which may cause node 12a to not properly log an address. Without timer 32, the addressing scheme may hang indefinitely while host computer 14 waits for an acknowledgment from malfunctioning node 12a. By using timer 32, switch 36 may be operated after the threshold time to connect communication bus input 38 with communication bus output 40, regardless of successful addressing of node 12a, allowing the addressing scheme to continue such that the next node 12a on communication bus 16 may receive its address from host computer 14. The threshold time may be set at the time of manufacture, or may be controllable through, for example, discrete hardware inputs or other means. To facilitate faster communication with downstream nodes 12a, controller 30 may be configured to override timer 32. For example, if controller 30 determines that successful addressing has occurred, or if controller 30 determines that node 12*a* has properly booted, prior to receipt of an address, timer 32 may be overridden, and node 12*a* may continue with the addressing scheme.

Host computer 14 may also include timer 24 (Shown in FIG. 1). Timer 24 may be implemented as any analog or digital timer circuit. Upon detecting connection to a node 12*a*, or upon another detected condition, host computer 14 may start timer 24. If timer 24 reaches a threshold value prior to receiving an acknowledgment from node 12*a*, host computer 14 may reset timer 24 and move on to addressing the next node 12*a* in line on communication bus 16. Host computer 14 and node 12*a* may share a common threshold, or host computer 14 may have a slightly longer threshold time in order to ensure enough time for switch 36 to connect communication input 38 with communication output 40, allowing communication with the next node 12*a*. Further, host computer 14 may have a greater threshold than timer 36 of node 12*a* to provide node 12*a* with adequate time to allow heating element 46 to adequately raise the temperature of the components of node 12*a*.

FIG. 2B is a block diagram illustrating node 12*b* that is connected within network 10. Node 12*b* includes controller 30, timer 32, transceiver 34, communications input 38, communications output 40, capacitor 42, terminating resistor 44, optional heating element 46 and switches 50 and 52. While illustrated as switches, switches 50 and 52 may be any other devices controllable to select between one or more states. For example, switches 50 and 52 may be relays, repeaters, and/or one or more transistors. Common elements between FIGS. 2A and 2B may operate in a substantially similar manner.

An address is received from host computer 14 on communications input 38 and is received by controller 30 through transceiver 34. Upon receipt of the address, controller 30 stores the address, for example, in a local memory that may be integral to, or separate from, controller 30. Following logging of the address, controller 30 provides an acknowledgement on communication bus 16 intended for host computer 14. Following acknowledgement, controller 30 operates switch 50 to connect power to the next node 12*b* down the line from the present node 12*b*, and operates switch 52 to disconnect terminating resistor 44 from communication bus 16. This allows host computer 14 to provide an address to the next node 12*b* within network 10.

Although illustrated with terminating resistor 44, in other embodiments, node 12*b* may not include terminating resistor 44. For example, if network 10 includes end terminating resistor 26, each node 12*b* may not need a respective terminating resistor 44. Because communication to downstream nodes 12*b* is controlled by controlling power to downstream nodes 12*b* and not by controlling connection to communication bus 16, end terminating resistor 26 may always be connected to communication bus 16, eliminating the need for respective terminating resistors 44.

Timer 32 may be configured to begin counting upon receiving power from power bus 18 in the embodiment shown in FIG. 2B. In this embodiment, because power is not provided to all nodes 12*b* at once, host computer 14 may increase its timing threshold to provide adequate time for heating element 46 to heat up each respective node 12*b*, as opposed to only the first node 12*a* in the embodiment shown in FIG. 2A. Upon timer 32 reaching the threshold time, or upon controller 30 determining that successful addressing has occurred, switch 50 may be operated to connect power to the next node 12*b* in line and switch 52 may be operated to disconnect terminating resistor 44 from communication bus 16. To facilitate faster communication with downstream nodes 12*b*, controller 30 may be configured to override timer 32. For example, if controller 30 determines that successful addressing has occurred, or if controller 30 determines that node 12*a* has properly booted, prior to receipt of an address, timer 32 may be overridden, and node 12*a* may continue with the addressing scheme.

Figure 3A:
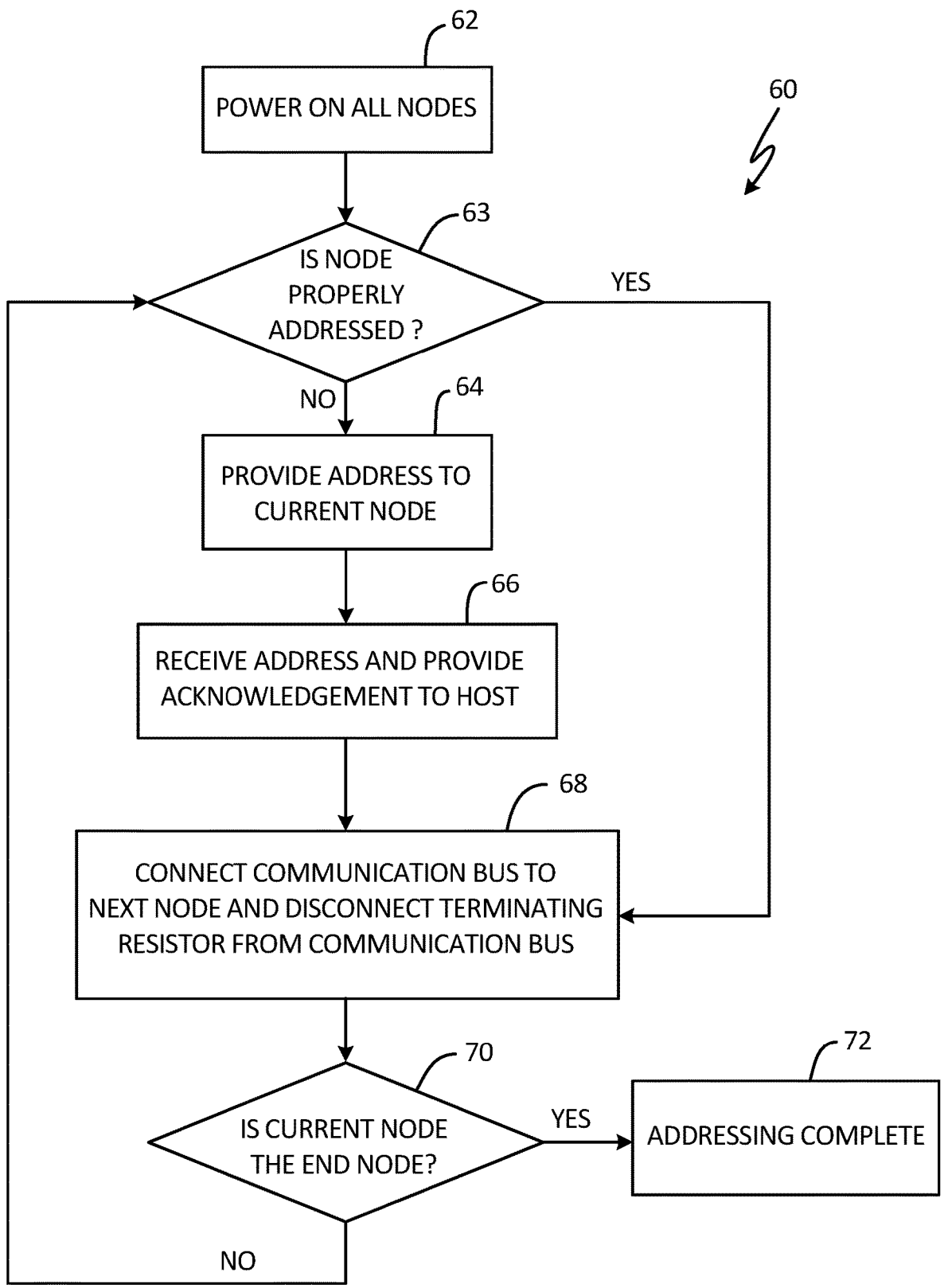
FIGS. 3A and 3B are flowcharts illustrating methods of addressing a network of nodes connected to a host computer.
Figure 3B:
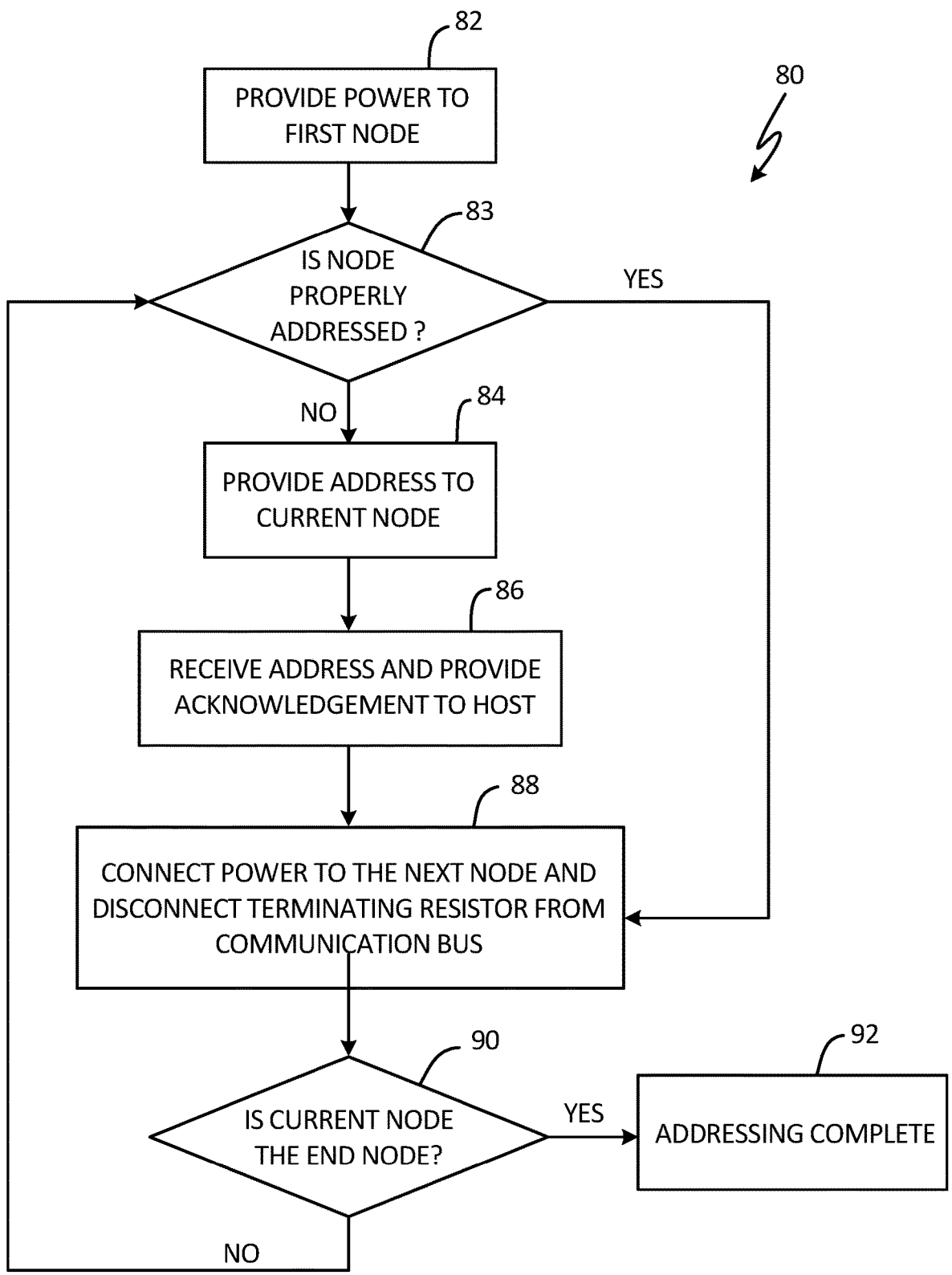

FIGS. 3A and 3B are flowcharts illustrating methods of addressing network 10 of nodes 12 connected to host computer 14. FIG. 3A is a flowchart illustrating method 60 of addressing network 10 of nodes 12*a* as shown in the embodiment illustrated in FIG. 2A. At step 62, initial power is provided to all nodes 12*a*. At system startup, the first node 12*a* in line from host computer 14 is in communication with host computer 14 on communication bus 16. Heating element 46 may be utilized to increase the temperature of respected nodes 12*a* as needed. Communication is cut off from all other nodes 12*a* downstream of the first node 12*a* on communication bus 16.

In some embodiments, nodes 12*a* may be configured to store its address for an extended period of time, such as in a local non-volatile memory. This way, nodes 12*a* do not need to be addressed each time network 10 is started. At step 63, it may be determined if the present node 12*a* is already properly addressed. Node 12*a* may make this determination and provide an indication to host computer 14, or host computer 14 may make this determination. If node 12*a* is already properly addressed, method 60 may proceed to step 68. If node 12*a* is not already properly addressed, method 60 may proceed to step 64 to address node 12*a*. In other embodiments, step 63 may not be necessary and all nodes 12*a* may be addressed each time network 10 is started.

The next node 12*a* in line from host computer 14 on communication bus 16 receives an address from host computer 14 at step 64. This communication may be a series of bits or any other form of communication on communication bus 16 that nodes 12*a* recognize as a new address command from host computer 14. Host computer 14 tracks the addresses provided to each node 12*a* in a local memory, for example, to facilitate future communication with each respective node 12*a*. At step 66, node 12*a* receives the respective address from host computer 14. Node 12*a* knows that the address is for itself, as node 12*a* has not yet received an address but is receiving communications from host computer 14 on communication bus 16. Upon receipt of the address, node 12*a* stores the address in a local memory that may be integral to, or separate from, controller 30. The address is stored so that node 12*a* can distinguish future communication from host computer 14 on communication bus 16. Following logging of the address, node 12*a* provides an acknowledgement to host computer 14 on communication bus 16. This acknowledgement may be a specific series of data bits, or may be any other communication recognizable by host computer 14 as an acknowledgement from node 12*a*. After addressing of node 12*a* is complete, node 12*a* no longer responds to addressing communications provided on bus 16 from host computer 14.

At step 68, node 12*a* connects communications input 38 to communications output 40 and disconnects terminating resistor 44 from communication bus 16. If network 10 does not require the use of terminating resistors 44, node 12*a* will only connect communications input 38 to communications output 40. At step 70, if any nodes 12*a* still require addressing, method 60 returns to step 64 to continue addressing nodes 12*a*. If the current node 12*a* is the end node of network 10, method 60 proceeds to step 72 and addressing of nodes 12a is completed. It is not necessary for node 12a to know that it is the end node. Network 10 may include end terminating resistor 26 so that the end node 12a may disconnect its terminating resistor 44 regardless of its status as an end node. In other embodiments in which network 10 does not include end terminating resistor 26, node 12a may be programmed as an end node and not disconnect its terminating resistor 44 from communication bus 16.

FIG. 3B is a flowchart illustrating method 80 of addressing network 10 of nodes 12b as shown in the embodiment illustrated in FIG. 2B. At step 82, initial power is provided to the first node 12b in line from host computer 14 on communication bus 16. In some embodiments, nodes 12b may be configured to store its address for an extended period of time, such as in a local non-volatile memory. This way, nodes 12b do not need to be addressed each time network 10 is started. At step 83, it may be determined if the present node 12b is already properly addressed. Node 12b may make this determination and provide an indication to host computer 14, or host computer 14 may make this determination. If node 12b is already properly addressed, method 80 may proceed to step 88. If node 12b is not already properly addressed, method 80 may proceed to step 84 to address node 12b. In other embodiments, step 83 may not be necessary and all nodes 12b may be addressed each time network 10 is started.

At step 84, the next node 12b in line from host computer 14 on communication bus 16, which will have just received initial power from power bus 18, receives an address from host computer 14. In some embodiments host computer 14 may provide a short delay to allow heating element 46 to bring the next node 12b in line to operating temperature. Host computer 14 tracks the addresses provided to each node 12b in a local memory, for example, to facilitate future communication with each respective node 12b. At step 86, node 12b receives the respective address from host computer 14. Node 12b knows that the address is for itself, as node 12b has not yet received an address but is receiving communications from host computer 14 on communication bus 16. Upon receipt of the address, node 12b stores the address in a local memory that may be integral to, or separate from, controller 30. The address is stored so that node 12b can distinguish future communication from host computer 14 on communication bus 16. Following logging of the address, node 12b provides an acknowledgement to host computer 14 on communication bus 16. This acknowledgement may be a specific series of data bits, or may be any other communication recognizable by host computer 14 as an acknowledgement from node 12b.

At step 88, node 12b connects power from power bus 18 to the next node 12b in line. In some embodiments, node 12b also disconnects terminating resistor 44 from communication bus 16. In other embodiments, an end terminating resistor 26 may be utilized to eliminate the need for respective terminating resistors 44 for each node 12b. At step 90, if any nodes 12b still require addressing, method 80 returns to step 84 to continue addressing nodes 12b. If the current node 12b is the end node of network 10, method 80 proceeds to step 92 and addressing of nodes 12b is completed. It is not necessary for node 12b to know that it is the end node. Network 10 may include end terminating resistor 26 so that the end node 12b may disconnect its terminating resistor 44 regardless of its status as an end node.

Figure 4:
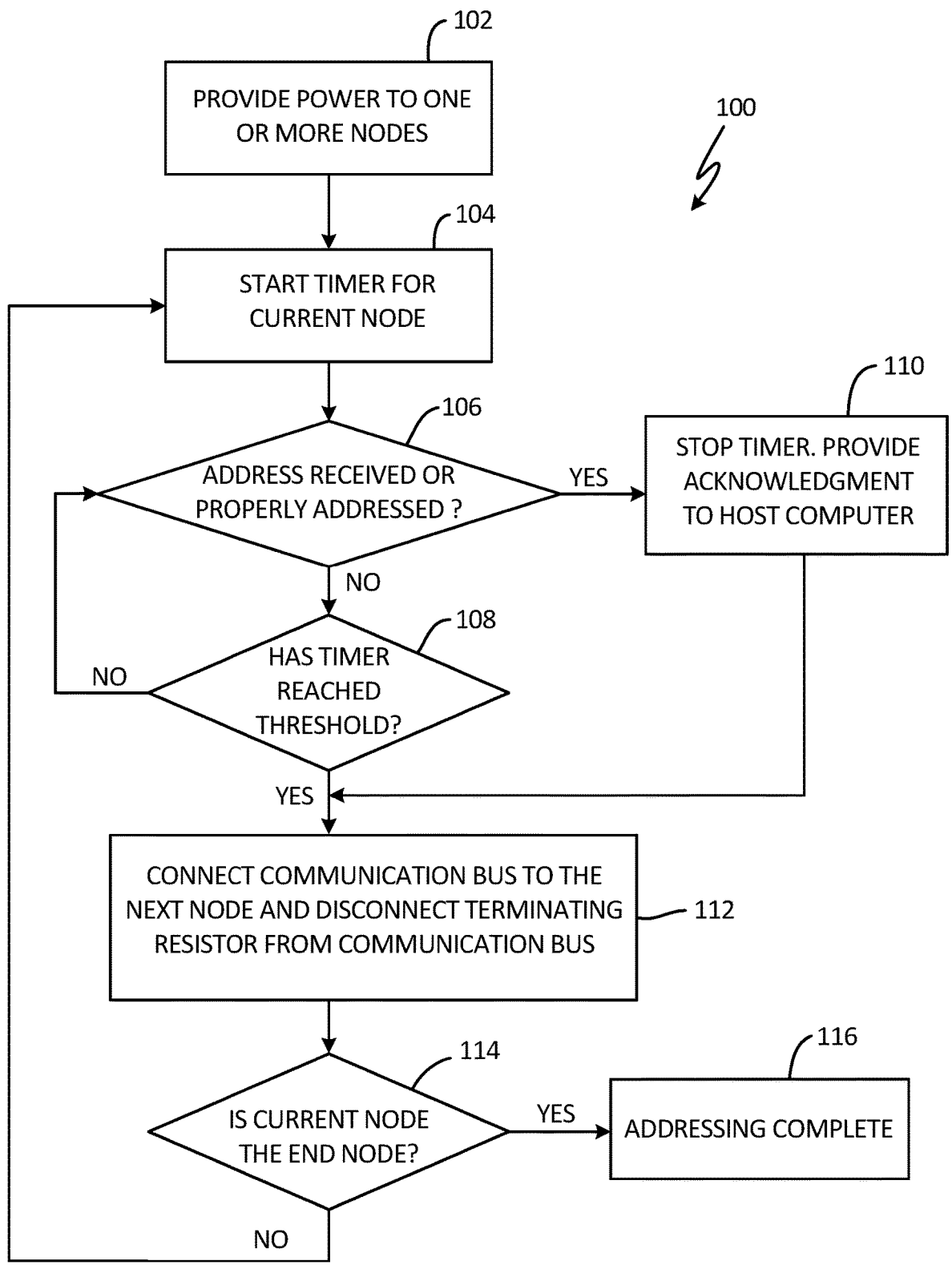
FIG. 4 is a flowchart illustrating a method of mitigating failures when addressing a network of nodes.

FIG. 4 is a flowchart illustrating method 100 of mitigating failures when addressing network 10 of nodes 12. When using an automated addressing and/or automated address identification approach for a wired node network, one or more defective nodes can disrupt all or part of network 10. Having a defective node can affect the integrity of communication bus 16, prevent communication to downstream nodes 12, and/or affect the correlation of nodes to their physical location.

Power is provided to one or more of nodes 12 at step 102. At step 104, timer 32 is started for the current node 12. At step 106, it is determined if an address has been received for node 12 or if node 12 is already properly addressed. For example, node 12 may have stored an address in a local non-volatile memory. If the address has been received or node 12 is already properly addressed, method 100 proceeds to step 110 and if an address has not been received, method 100 proceeds to step 108. In other embodiments, node 12 may not start timer 32 if node 12 is already properly addressed.

At step 108, if timer 32 has reached a threshold, method 100 proceeds to step 112, and if the timer 32 has not reached the threshold, method 100 returns to step 106. At step 110, if an address had been received, node 12 stops timer 32 and provides an acknowledgement to host computer 14. In another embodiment, node 12 may stop timer 32 prior to receiving an address if controller 30 verifies proper startup and/or functionality of node 12 prior to receiving an address.

At step 112, node 12a connects communications input 38 to communications output 40 for the embodiment shown in FIG. 2A, or connects power bus 18 to the next node 12b for the embodiment shown in FIG. 2B. In embodiments in which nodes 12 include terminating resistors 44, node 12 disconnects terminating resistor 44 from communication bus 16. At step 114, if any nodes 12 still require addressing, method 100 returns to step 104 to continue addressing nodes 12. If the current node 12 is the end node, method 100 proceeds to step 116 and addressing of nodes 12 is completed. It is not necessary for node 12 to know that it is the end node. Network 10 may include end terminating resistor 26 so that the end node 12 may disconnect its terminating resistor 44 regardless of its status as an end node. In other embodiments in which network 10 does not include end terminating resistor 26, node 12 may be programmed as an end node and not disconnect its terminating resistor 44 from communication bus 16.

Discussion of Possible Embodiments

The following are non-exclusive descriptions of possible embodiments of the present invention.

A method of addressing a plurality of nodes for a communication network includes starting a first timer; providing, from a host computer, a first address to the first node over the communication network; connecting, by the first node, a first communication input to a first communication output if the first address is successfully received by the first node; connecting, by the first node, the first communication input to the first communication output if the first timer reaches a first threshold; and providing, from the host computer, a second address to a second node of the plurality of nodes.

The method of the preceding paragraph can optionally include, additionally and/or alternatively, any one or more of the following features, configurations, operations, and/or additional components:

A further embodiment of the foregoing method, further including disconnecting, by the first node, a first terminating resistor from the communication network if the first address is successfully received by the first node; and disconnecting, by the first node, the first terminating resistor from the communication network if the first timer reaches the first threshold and the first node has not yet disconnected the terminating resistor.

A further embodiment of any of the foregoing methods, wherein the host computer includes a second timer, and wherein providing, from the host computer, the second address to a second node includes providing, from the host computer, the second address upon the second timer reaching a second threshold or upon receipt of an acknowledgment from the first node on the communication network.

A further embodiment of any of the foregoing methods, wherein the first and second thresholds are equal.

A further embodiment of any of the foregoing methods, wherein the first timer includes a capacitor and wherein starting the first timer by the first node comprises charging the capacitor.

A further embodiment of any of the foregoing methods, further including powering, by the first node, a heating element to increase a temperature of components of the first node to an operational temperature.

A further embodiment of any of the foregoing methods, further including starting, by the second node of the plurality of nodes, a second timer upon detecting connection to the host computer through the communication network; connecting, by the second node, a second communication input to a second communication output if the second address is successfully received by the second node; connecting, by the second node, the second communication input to the second communication output if the second timer reaches a second threshold; and providing, from the host computer, a third address to a third node of the plurality of nodes.

A further embodiment of any of the foregoing methods, wherein connecting, by the first node, the first communication input to the first communication output includes controlling a repeater to connect the first communication input to the second node.

A method of addressing each of a plurality of nodes for a communication network includes powering, by a power bus, a first node of the plurality of nodes at a first power input; starting a first timer by the first node; providing, from a host computer, a first address to the first node over the communication network; connecting, by the first node, the power bus to a second node of the plurality of nodes if the first address is successfully received by the first node; connecting, by the first node, the power bus to the second node if the first timer reaches a first threshold; and providing, from the host computer, a second address to the second node of the plurality of nodes.

The method of the preceding paragraph can optionally include, additionally and/or alternatively, any one or more of the following features, configurations, operations, and/or additional components:

A further embodiment of the foregoing method, further including disconnecting, by the first node, a first terminating resistor from the communication network if the first address is successfully received by the first node; and disconnecting, by the first node, the first terminating resistor from the communication network if the first timer reaches the first threshold.

A further embodiment of any of the foregoing methods, wherein the host computer includes a second timer, and wherein providing, from the host computer, the second address to a second node includes providing, from the host computer, the second address upon the second timer reaching a second threshold or upon receipt of an acknowledgment from the first node on the communication network.

A further embodiment of any of the foregoing methods, wherein the first and second thresholds are equal.

A further embodiment of any of the foregoing methods, wherein the first timer includes a capacitor and wherein starting the first timer by the first node comprises charging the capacitor.

A further embodiment of any of the foregoing methods, further including powering, by the first node, a heating element to increase a temperature of components of the first node.

A further embodiment of any of the foregoing methods, further including starting, by the second node of the plurality of nodes, a second timer upon receiving power from the power bus; connecting, by the second node, the power bus to a third node of the plurality of nodes if the second address is successfully received by the second node; connecting, by the second node, the power bus to the third node of the plurality of nodes if the second timer reaches a second threshold; and providing, from the host computer, a third address to a third node of the plurality of nodes.

A network includes a host computer, a communication bus connected to the host computer, and a plurality of nodes connected to the communication bus. Each of the plurality of nodes includes a node controller, a timer, a communication input connected to the communication bus and a communication output connected to the communication bus. The node controller is configured to connect the communication input to the communication output upon successful receipt of an address from the host computer or upon the timer reaching a threshold.

The network of the preceding paragraph can optionally include, additionally and/or alternatively, any one or more of the following features, configurations, operations, and/or additional components:

A further embodiment of the foregoing network, wherein each of the plurality of nodes further includes a terminating resistor, wherein the node controller is configured to disconnect the terminating resistor from the communication bus upon successful receipt of the address from the host computer or upon the timer reaching the threshold.

A further embodiment of any of the foregoing networks, wherein each of the plurality of nodes further includes a heating element, wherein the heating element is configured to increase a temperature of the respective one of the plurality of nodes to an operational temperature.

A further embodiment of any of the foregoing networks, further including an end terminating resistor connected to the communication bus, wherein the plurality of nodes are connected to the communication bus between the host computer and the end terminating resistor.

A further embodiment of any of the foregoing networks, wherein the node controller for each of the plurality of nodes is further configured to provide an indication to the host controller and connect the communication input to the communication output if the respective one of the plurality of nodes is already addressed.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodi-

The invention claimed is:

1. A method of addressing a plurality of nodes for a communication network, the method comprising:
    detecting, by a first node of the plurality of nodes, connection to a host computer on the communication network;
    starting, by the first node, a first timer upon the detection of connection to the host computer;
    providing, from the host computer, a first address to the first node over the communication network;
    connecting, by the first node, a first communication input to a first communication output if the first address is successfully received by the first node so as to enable the method to be performed in relation to downstream nodes;
    stopping, by the first node, the first timer, if the first address is successfully received by the first node;
    sending, by the first node, an acknowledgment of receipt of the first address over the communication network, if the first address is successfully received;
    connecting, by the first node, the first communication input to the first communication output if the first timer reaches a first threshold so as to enable the method to be performed in relation to downstream nodes;
    providing, from the host computer, a second address to a second node of the plurality of nodes on the communication network upon receipt of the acknowledgment from the first node; and
    providing, from the host computer, the second address to the second node of the plurality of nodes if a second timer reaches a second threshold prior to receipt of the acknowledgment, wherein the second threshold is greater than or equal to the first threshold.

2. The method of claim 1, further comprising:
    disconnecting, by the first node, a first terminating resistor from the communication network if the first address is successfully received by the first node; and
    disconnecting, by the first node, the first terminating resistor from the communication network if the first timer reaches the first threshold and the first node has not yet disconnected the terminating resistor.

3. The method of claim 1,
    wherein the first and second thresholds are equal to one another.

4. The method of claim 1, wherein the first timer includes a capacitor and wherein starting the first timer by the first node comprises charging the capacitor.

5. The method of claim 1, further comprising:
    powering, by the first node, a heating element to increase a temperature of components of the first node to an operational temperature.

6. The method of claim 1, further comprising:
    starting, by the second node of the plurality of nodes, a third timer upon detecting connection to the host computer on the communication network;
    connecting, by the second node, a second communication input to a second communication output, if the second address is successfully received by the second node;
    stopping, by the second node, the third timer, if the second address is successfully received by the second node;
    sending, by the second node, a second acknowledgment of receipt of the second address over the communication network, if the second address is successfully received;
    connecting, by the second node, the second communication input to the second communication output if the third timer reaches a third threshold; and
    providing, from the host computer, a third address to a third node of the plurality of nodes.

7. The method of claim 1, wherein connecting, by the first node, the first communication input to the first communication output comprises controlling a repeater to connect the first communication input to the second node.

8. A network comprising:
    a host computer that includes a host timer;
    a communication bus connected to the host computer, wherein the host computer is configured to provide addresses over the communication bus;
    a plurality of nodes connected to the communication bus, each of the plurality of nodes comprising:
    a node controller;
    a node timer;
    a communication input connectable to the communication bus;
    a communication output connectable to the communication bus;
    wherein the node controller is configured to:
    detect connection to the host computer on the communication bus;
    start the node timer upon the detection of connection to the host computer;
    connect the communication input to the communication output upon successful receipt of an address from the host computer so as to enable downstream nodes connected thereby to detect connection to the host computer;
    stop the node timer, if the first address is successfully received by the node;
    send an acknowledge of receipt of the address over the communication bus, if the first address is successfully received;
    connect the communication input to the communication output upon the node timer reaching a first threshold so as to enable downstream nodes connected thereby to detect connection to the host computer; and
    provide the acknowledgement to the host computer over the communication bus upon the successful receipt of the address from the host computer;
    wherein the host computer is configured to provide a subsequent address upon receipt of the acknowledgement on the communication bus,
    wherein the host computer is further configured to provide the subsequent address if a second timer reaches a second threshold prior to receipt of the acknowledgment, and
    wherein the second threshold is greater than or equal to the first threshold.

9. The network of claim 8, wherein each of the plurality of nodes further comprises:
    a terminating resistor, wherein the node controller for each of the plurality of nodes is further configured to disconnect the terminating resistor from the communication bus upon successful receipt of the address from the host computer or upon the node timer reaching the first threshold.

10. The network of claim 8, wherein each of the plurality of nodes further comprises:
    a heating element, wherein the heating element is configured to increase a temperature of the respective one of the plurality of nodes to an operational temperature.

11. The network of claim 8, further comprising:
an end terminating resistor connected to the communication bus, wherein the plurality of nodes are connected to the communication bus between the host computer and the end terminating resistor.

12. The network of claim 8, wherein the node controller for each of the plurality of nodes is further configured to provide an indication to the host controller and connect the communication input to the communication output if the respective one of the plurality of nodes is already addressed.

\* \* \* \* \*